United States Patent Office 3,328,739
Patented June 27, 1967

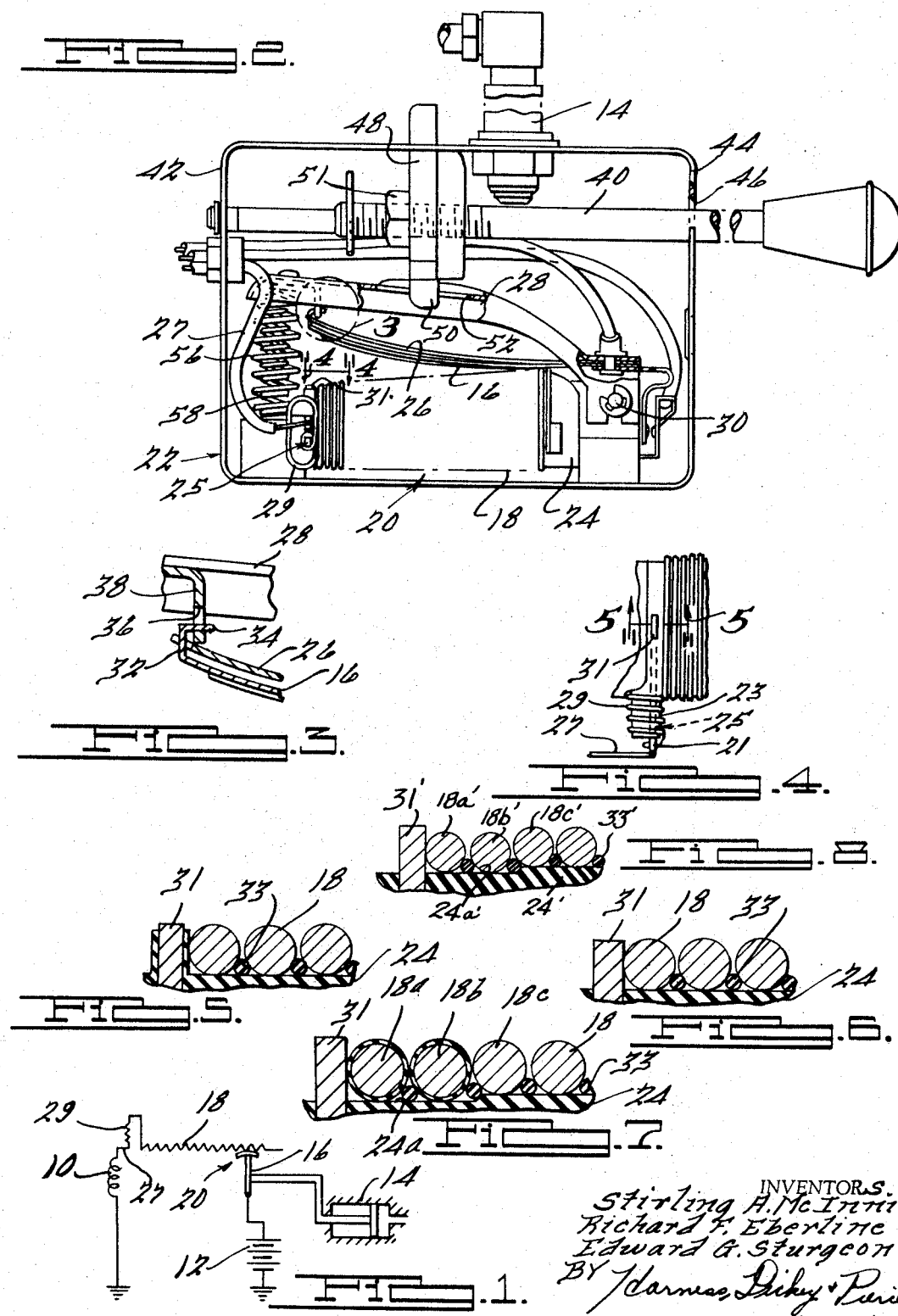

3,328,739
ELECTRIC BRAKE CONTROLLER PROTECTOR
Stirling A. McInnis, Troy, Richard F. Eberline, Rochester, and Edward G. Sturgeon, Orchard Lake, Mich., assignors to Syncro Corporation, Oxford, Mich., a corporation of Michigan
Filed Mar. 29, 1965, Ser. No. 443,575
10 Claims. (Cl. 338—96)

This invention relates to brake controllers for electrically actuated brakes for vehicle trailers or the like and more particularly to an improved construction for a control winding or control circuit for use therewith.

In brake controllers of the type to which the present invention is related, braking is controlled by selectively including more or less turns of a control winding in series with the brake coil. It has been found that under a braking condition when only a few or less turns are in the circuit and there is a partial short in the brake circuit, these turns can burn out resulting in loss of braking.

Therefore it is an object of this invention to provide an improved brake controller winding in which burn out of one or more of the turns is prevented under high current conditions.

It is another object to provide an improved control circuit for an electric brake controller.

Other objects, features and advantages of the present invention will become apparent from the subsequent description and the appended claims, taken in conjunction with the accompanying drawings, in which:

FIGURE 1 is a schematic diagram showing an electrical circuit including the controller and improved control circuit of this invention;

FIGURE 2 is a side elevational view of the brake controller embodying features of the present invention;

FIGURE 3 is an enlarged, fragmentary view with some parts shown in section of the area of FIGURE 2 included in the dot-dash circle 3;

FIGURE 4 is a view of the winding of the controller of FIGURE 2 taken generally in the direction of the arrows 4—4;

FIGURE 5 is an enlarged, fragmentary sectional view of the winding of FIGURES 2 and 4 taken substantially along the line 5—5 in FIGURE 4;

FIGURE 6 is a view similar to FIGURE 5 of a first modification of the winding structure of FIGURES 2, 4 and 5;

FIGURE 7 is a view similar to FIGURE 5 of a second modification of the winding structure of FIGURES 2, 4, and 5; and FIGURE 8 is a view similar to FIGURE 7 of a different modification of the structure of FIGURE 7.

Briefly, the illustrated embodiment of the invention comprises a wound wire control winding with a movable contact in the form of a spring-like arcuate conductor carried by an arm which is pivoted at one end and which when swung in one direction will cause the conductor to engage a progressively greater number of control winding turns. The arm is operated by swinging a lever either manually or by means of a hydraulic piston.

The means for returning the conductor supporting arm after the actuating lever has been released comprises a pair of nested helical coil compression springs. The outer spring is relatively stiff, but has little or no compression when the conductor supporting arm is in its released or non-braking position. The inner spring is weaker than the outer spring but has a substantial amount of compression when the conductor supporting arm is in its released position. The inner spring will therefore control the amount of force required to initially move the conductor supporting arm, and will also insure full return of the conductor supporting arm to its released position. The outer spring will control the amount of force needed to move the conductor supporting arm to its full braking position. By varying the sizes and characteristics of the two springs, any given combination of initial and final actuating forces for the conductor supporting arm may be selected.

Referring more particularly to the drawings, FIGURE 1 schematically illustrates an electromagnetic brake coil 10 for a brake on a vehicle trailer or the like (not shown), the coil being supplied with current from a voltage source 12 which may be a battery mounted on a tractor or towing vehicle. In order that the tractor and trailer brakes be simultaneously and synchronously applied, a piston and cylinder 14 is connected by a conduit to the hydraulic system for the tractor brakes (not shown). The piston actuates a movable conductor 16 which is in contact with a wound wire winding 18. The conductor 16 and winding 18 together define a rheostat 20 which is in series with battery 12 and brake coil 10. An increase in pressure to piston-cylinder 14 will decrease the resistance in the circuit thereby increasing the current to brake coil 10 to increase the braking force.

The construction of the brake controller is generally similar to that shown in Ross Patent No. 2,829,225 issued Apr. 1, 1958, and also to the copending United States patent application of Stirling A. McInnis, No. 328,261, filed Dec. 5, 1963. The brake controller has a housing generally indicated at 22 within which is mounted the control winding 18 which is wound on a dielectric core 24. The construction of coil 18 and core 24 may be generally of the type shown and described in Patent No. 2,852,647 issued Sept. 16, 1958, to Thomas F. Carmichael. The core 24 is provided with an embedded terminal 25 which has a portion 21 which extends outwardly and provides means for the connection of a conductor 27 from coil 10. An insulating portion 23 of the core extends outwardly, coextensively with and practically covers the terminal portion 21. An end portion 29 of the control winding 18 is wound about the insulating portion 23 with the terminal portion 21 and end portion 29 finally being commonly connected to conductor 27. The terminal 25 has an upwardly extending stop portion 31 which can be engaged by the conductor 16 in its fully down position. The function of the end portion 29 and stop 31 will be understood from a discussion to follow. Looking to FIGURE 5 the individual coils of the control winding 18 are spearated from each other by an interwound coil of insulating cord 33 which is of a preselected diameter to assure that the coils will not touch. The end 33 can be made of glass or some other suitable material.

Conductor 16 comprises a strip of electrically conductive material backed up by a strip 26 of spring-like material, the strips being curved and secured at their opposite ends to a conductor supporting arm 28. The rearward end of arm 28 is adjustably pivoted to the housing by a pivot pin and slot 30, and rocking of the arm 28 counterclockwise from the FIGURE 2 position will result in conductor 16 engaging a progressively greater number of turns of winding 18. The connections are such that this will progressively decrease the resistance in the circuit for coil 10. The conductor 16 is fixed at one end to the pivoted end of arm 28 and is movably held at the opposite end by means of an upwardly and rearwardly bent portion 32 having a rearwardly extending tab portion 34 located within a slot 36 in a bracket 38 depending from the front end of the arm 28. The latter construction permits the forward end of the conductor 16 to move and serves a purpose to be described.

An actuating lever 40 extends through front and rear walls 42 and 44 of the housing 22 and is pivotally and rotatably connected to wall 42, wall 44 having a slotted portion 46 for permitting lever 40 to swing clockwise from its FIGURE 2 position. The details of the pivot mounting means for lever 40 are described in the patent application of McInnis, supra, it being sufficient for the present invention to appreciate that lever 40 may be rotated on its own axis and may also be swung counterclockwise from its FIGURE 2 position.

A connecting member 48 is threadably mounted on lever 40 and connects this lever with arm 28. The connecting member 48 has a projection 50 located in a slot 52 in arm 28. Thus clockwise rocking of lever 40 will cause counterclockwise rocking of arm 28. By rotating lever 40 and thus axially shifting member 48, the effective relative moment arms may be selectively varied and hence the forces required to actuate the arm 28 may be selectively varied. This adjustment feature permits coordination of braking action in any given tractor-trailer combination.

The lever 40 can be actuated manually by a handle 54 secured to the outer end thereof or by the piston-cylinder 14 with the piston having an outer end hydraulically engageable with an intermediate portion of lever 40. A lock nut 51 is provided to secure member 48 in any selected position.

The arm 28 is returned to its released or non-braking position by a pair of nested springs 56 and 58.

In operation, lever 40 will be swung clockwise from its FIGURE 2 position, either manually or hydraulically by piston-cylinder 14, and will thereby cause arm 28 to swing counterclockwise. This will cause conductor 16 to engage a successively greater number of turns of control winding 18, thereby reducing the number of turns in series with the coil 10 and hence increasing the current to coil 10. As the arm 28 is pivoted to its extreme counterclockwise position it moves the conductor 16 into engagement with the stop portion 31; in this condition the control winding 18 is completely shunted and maximum current is delivered to the brake coil 10. As previously noted with a partial short in the circuit following the control winding 18 and with the conductor 16 engaging all of the coils but the last one or two, these last one or two can burn out as a result of the high amplitude of the current flow. In order to protect these coils from burn out extra resistance has been added in the circuit by means of the end portion 29 located on the insulating portion 23, which portion 29 has a resistance value selected to prevent burn out even if the conductor 16 engages only the very last coil of winding 18. If the high current condition is sustained substantial heat will be generated causing thermal expansion of the conductor 16. The engaging surface of conductor 16 is slightly concave and as the conductor 16 expands thermally its forward end which is free to move in slot 36 bends downwardly and engages the stop portion 31 whereby the current is shunted from the control winding 20 and hence damage due to sustained high current is prevented; note that in this condition the end portion 29 is likewise shunted. The external resistance provided by end portion 29 can be selected to completely protect the winding 18 independently of any thermal expansion action of the conductor 16.

In a slightly modified structure in FIGURE 6 the last turn of the coil 18 is positioned in engagement with the stop portion 31. In this embodiment the end portion 29 is eliminated. The stop portion 31 acts as a heat sink and prevents burn out of the last turn if it is engaged by conductor 16 under a high current condition. In order to protect the adjacent turns from damage due to a sustained high current condition the size of the insulating cord 33 has been selected relative to the diameter of the wire of the winding 18 whereby adjacent coils, at least at the end near terminal 25, are spaced a selected distance from each other. This distance is selected such that in the event of a sustained high current condition thermal expansion of the coils will be such that adjacent end coils will eventually engage thereby providing for an increase in total cross section and a reduction in current density in each coil and hence protecting the end coils of control winding 20. It was found that proper thermal expansion occurred when using No. 19 wire for the winding 18 and an insulating coil 33 of a diameter of from .009 to .011"; the distance between coils was approximately .0006". Note that while the embodiment of FIGURE 6 has been discussed separately the embodiments of FIGURE 6 could be combined with features of the embodiment of FIGURES 2–5.

Looking now to FIGURE 7, a second modification is shown in which the last turns 18a and 18b are located in a reduced section portion 24a of core 24 so as to be generally below the surface of the remaining coils. Thus when the conductor 16 is depressed downwardly it cannot contact these last turns 18a and 18b. Since the burn out condition previously discussed is present only when the last few turns are engaged by conductor 16, the construction of FIGURE 7 eliminates the problem. In order to insure that turns 18a and 18b are not engaged by conductor 16 they can be insulated as shown in FIGURE 7. Note in a sense, in FIGURE 7, the last contacted turn can be considered to be 18c in which case turns 18a and 18b serve a function similar to the end portion 29 in the embodiment of FIGURES 2–4. Again it should be appreciated that features of the embodiment of FIGURE 7 can be combined with features of the embodiment of FIGURE 6 as well as with features of the embodiment of FIGURES 2–5.

FIGURE 8 shows a combination of features shown in FIGURES 6 and 7 and similar primed numerical designations have been used for similar components. In FIGURE 8 the core 24' has a reduced section 24a' such that the last turns 18a' and 18b' are located below the surface of the remaining coils such that conductor 16 cannot contact these last turns. Note also that the last turn 18a' is in electrical, physical engagement with the stop portion 31'.

While it will be apparent that the preferred embodiments of the invention disclosed are well calculated to fulfill the objects above stated, it will be appreciated that the invention is susceptible to modification, variation and change without departing from the proper scope or fair means of the subjoined claims.

What is claimed is:

1. In a brake controller for electrically actuated brakes which controller can be subject to an excessive current condition, a rheostat comprising: a dielectric core, a control winding having a plurality of axially spaced coils supported upon said core, a terminal located at one end of said core and having a stop portion constructed of a good conductor of electricity and supported by said core, a flexible conductor extending from a first end proximate the first of said coils at the opposite end of said core to a second end at said stop portion, actuating means for moving said flexible conductor into engagement with consecutive ones of said coils starting at said first end and finally ending with said stop portion, said control winding having an end portion of a preselected insulated length supported upon said terminal for adding a preselected amount of resistance of said control winding sufficient to prevent burn out of the coils adjacent said stop portion under the excessive current condition, said core having a reduced section portion at said one end proximate to said stop portion with the end coils at said one end located therein and with said end coils being insulated from electrical contact by said conductor, adjacent ones of at least some of said coils at said stop portion being spaced a preselected distance from each other with said adjacent ones engaging each other as a result of thermal expansion from the excessive current condition, said conductor having a tab portion movably supported in a slot on said actuating means and having a contour portion being curved inwardly transversely of its length such that with said conductor engaging all but the last of said coils and under the excessive current condition, thermal expansion of said conductor will bend said conductor into engagement with said stop portion and not in contact with the last of said coils adjacent said stop portion, and means for electrically connecting said terminal, said winding, and said flexible conductor to an external circuit.

2. In a brake controller for electrically actuated brakes which controller can be subject to an excessive current condition a rheostat comprising: a dielectric core, a control winding having a plurality of axially spaced coils supported upon said core, a stop member of a material being a good conductor of electricity located at one end of said core and supported by said core, first electrical circuit means electrically connected to said stop member for connecting said stop member to an external circuit, a flexible conductor extending from a first end proximate the first of said coils at the opposite end of said core to a second end at said stop member, means for moving said flexible conductor into engagement with consecutive ones of said coils starting at said first end and finally ending with said stop member, a resistance member located proximate said winding and having a preselected value of resistance sufficient when added to the resistance of any number of said coils to prevent burn out of the coils adjacent said stop member under the excessive current condition, and second electrical circuit means for electrically connecting one end of said resistance member to said winding and the other end to said first electrical circuit means such that when said flexible conductor engaves said stop member said winding and said resistance member are shunted by a circuit including said flexible conductor, said stop member and said first electrical circuit means.

3. In a brake controller for electrically actuated brakes which controller can be subject to an excessive current condition, a rheostat comprising: a dielectric core, a control winding having a plurality of axially spaced coils supported upon said core, a terminal located at one end of said core and having a stop portion constructed of a good conductor of electricity and supported by said core, a flexible conductor extending from a first end proximate the first of said coils at the opposite end of said core to a second end at said stop portion, actuating means for moving said flexible conductor into engagement with consecutive ones of said coils starting at said first end and finally ending with said stop portion, said control winding having an end portion of a preselected insulated length supported upon said terminal for adding a preselected amount of resistance to the coils of said control winding sufficient to prevent burn out of the coils adjacent said stop portion under the excessive current condition, said core having a reduced section portion at said one end proximate to said stop portion with said end coils being isolated from electrical contact by said conductor and with the last of said end coils being in electrical, physical engagement with said stop portion, adjacent ones of at least some of said coils at said stop portion being spaced a preselected distance from each other with said adjacent ones engaging each other as a result of thermal expansion from the excessive current condition, said conductor having a tab portion movably supported in a slot on said actuating means and having a contour portion curved inwardly transversely of its length such that with said conductor engaging all but the last of said coils and under the excessive current condition, thermal expansion of said conductor will bend said conductor into engagement with said stop portion and not in contact with the last of said coil adjacent said stop portion, and means for electrically connecting said terminal, said winding, and said flexible conductor to an external circuit.

4. In a brake controller for electrically actuated brakes which controller can be subject to an excessive current condition a rheostat comprising: a dielectric core, a control winding having a plurality of axially spaced coils supported upon said core, a stop member of a material being a good conductor of electricity located at one end of said core and supported by said core, first electrical circuit means electrically connected to said stop member for connecting said stop member to an external circuit, a flexible conductor extending from a first end proximate the first of said coils at the opposite end of said core to a second end at said stop member, means for moving said flexible conductor into engagement with consecutive ones of said coils starting at said first end and finally ending with said stop member, means isolating an end portion of said winding from electrical contact by said conductor with said end portion having a preselected value of resistance sufficient when added to the resistance of any number of said coils to prevent burn out of the coils adjacent said stop member under the excessive current condition, second electrical circuit means for electrically connecting said winding to the external circuit such that when said flexible conductor engages said stop member said winding is shunted by a circuit including said flexible conductor, said stop member and said first electrical circuit means.

5. In a brake controller for electrically actuated brakes which controller can be subject to an excessive current condition, a rheostat comprising: a dielectric core, a control winding having a plurality of axially spaced coils supported upon said core, a terminal located at one end of said core and having a stop portion constructed of a good conductor of electricity and supported by said core, a flexible conductor extending from a first end proximate the first of said coils at the opposite end of said core to a second end at said stop portion, means for moving said conductor into engagement with consecutive ones of said coils starting at said first end and finally ending with said stop portion, an electrical conductor having an insulated length supported upon said terminal and having a preselected value of resistance which when added to the resistance of any number of said coils is sufficient to prevent burn out of the coils adjacent said stop portion under the excessive current condition, circuit means electrically connecting one end of said electrical conductor to said terminal and the other end to said winding and means including said circuit means for electrically connecting said terminal, said winding and said flexible conductor to an external circuit.

6. The brake controller of claim 5 with said terminal being supported by said core and with said terminal having a post portion and with said insulated length of said electrical conductor being wound on said post portion.

7. In a brake controller for electrically actuated brakes which controller can be subject to an excessive current condition, a rheostat comprising: a dielectric core, a control winding having a plurality of axially spaced coils supported upon said core, a terminal located at one end of said core and having a stop portion constructed of a good conductor of electricity and supported by said core, a flexible conductor extending from a first end proximate the first of said coils at the opposite end of said core to a second end at said stop portion, actuating means for moving said flexible conductor into engagement with consecutive ones of said coils starting at said first end and finally ending with said stop portion, said core having a reduced section portion at said one end proximate to said stop portion with the end coils at said one end located therein and with said end coils being isolated from electrical contact by said conductor, and means for electrically connecting said terminal, said winding and said flexible conductor to an external circuit.

8. In a brake controller for electrically actuated brakes which controller can be subject to an excessive current condition, a rheostat comprising: a dielectric core, a control winding having a plurality of axially spaced coils supported upon said core, a terminal located at one end of said core and having a stop portion constructed of a good conductor of electricity and supported by said core, a flexible conductor extending from a first end proximate the first of said coils at the opposite end of said core to a second end at said stop portion, actuating means for moving said flexible conductor into engagement with consecutive ones of said coils starting at said first end and finally ending with said stop portion adjacent ones of at least those of said coils located at said one end of said core being spaced a preselected distance from each other with said adjacent ones engaging each other as a result of thermal expansion from the excessive current condition, and means for electrically connecting said terminal, said winding and said flexible conductor to an external circuit.

9. In a brake controller for electrically actuated brakes which controller can be subject to an excessive current condition, a rheostat comprising: a dielectric core, a control winding having a plurality of axially spaced coils supported upon said core, a terminal located at one end of said core and having a stop portion constructed of a good conductor of electricity and supported by said core, a flexible conductor extending from a first end proximate the first of said coils at the opposite end of said core to a second end at said stop portion, actuating means for moving said flexible conductor into engagement with consecutive ones of said coils starting at said first end and finally ending with said stop portion, said flexible conductor having a tab portion movably supported in a slot on said actuating means and having a contour portion curved inwardly transversely of its length such that with said conductor engaging all but the last of said coils and under the excessive current condition, thermal expansion of said flexible conductor will bend said flexible conductor into engagement with said stop portion, and means for electrically connecting said terminal, said winding and said flexible conductor to an external circuit.

10. In a brake controller for electrically actuated brakes which controller can be subject to an excessive current condition, a rheostat comprising: a dielectric core, a control winding having a plurality of axially spaced coils supported upon said core, a terminal located at one end of said core having a stop portion constructed of a good conductor of electricity and supported by said core, a flexible conductor extending from a first end proximate the first of said coils at the opposite end of said core to a second end at said stop portion, actuating means for moving said flexible conductor into engagement with consecutive ones of said coils starting at said first end and finally ending with said stop portion, the last of said coils at said one end of said core being located in electrical, physical engagement with said stop portion, said stop portion operating as a heat sink, and means for electrically connecting said terminal, said winding and said flexible conductor to an external circuit.

References Cited
UNITED STATES PATENTS

| 2,414,043 | 1/1947 | Honhart et al. | 338—92 |
| 2,829,225 | 4/1958 | Ross | 338—96 |
| 2,852,647 | 9/1958 | Carmichael | 338—141 |

RICHARD M. WOOD, *Primary Examiner.*

W. D. BROOKS, *Assistant Examiner.*